(12) United States Patent
Menssen et al.

(10) Patent No.: US 8,926,724 B2
(45) Date of Patent: Jan. 6, 2015

(54) FILTERING DEVICE, IN PARTICULAR AIR FILTER

(71) Applicant: Mann+Hummel GmbH, Ludwigsburg (DE)

(72) Inventors: Joerg Menssen, Tamm (DE); Karlheinz Muenkel, Oberderdingen-Flehingen (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/681,855

(22) Filed: Nov. 20, 2012

(65) Prior Publication Data

US 2014/0033666 A1 Feb. 6, 2014

Related U.S. Application Data

(63) Continuation-in-part of application No. 13/445,325, filed on Apr. 12, 2012, and a continuation-in-part of application No. PCT/EP2010/064930, filed on Oct. 6, 2010, and a continuation-in-part of application No. 12/589,527, filed on Feb. 26, 2009, now Pat. No. 8,313,549, and a continuation-in-part of application No. PCT/EP2009/052315, filed on Feb. 26, 2009.

(30) Foreign Application Priority Data

| Feb. 26, 2008 | (DE) | 10 2008 011 186 |
| Oct. 12, 2009 | (DE) | 10 2009 049 170 |
| Mar. 30, 2012 | (DE) | 10 2012 006 426 |

(51) Int. Cl.

| B01D 46/00 | (2006.01) |
| B01D 46/24 | (2006.01) |
| B01D 45/16 | (2006.01) |
| B01D 46/52 | (2006.01) |
| B01D 50/00 | (2006.01) |
| F02M 35/02 | (2006.01) |
| F02M 35/024 | (2006.01) |

(52) U.S. Cl.
CPC .......... *B01D 46/0004* (2013.01); *F02M 35/024* (2013.01); *F02M 35/02416* (2013.01); *B01D 46/0006* (2013.01); *B01D 46/2418* (2013.01); *B01D 2046/2492* (2013.01); *B01D 45/16* (2013.01); *B01D 46/0005* (2013.01); *B01D 46/0013* (2013.01); *B01D 46/0023* (2013.01); *B01D 46/009* (2013.01); *B01D 46/2411* (2013.01); *B01D 46/2422* (2013.01); *B01D 46/521* (2013.01); *B01D 46/525* (2013.01); *B01D 50/002* (2013.01); *F02M 35/0203* (2013.01); *B01D 2265/025* (2013.01); *B01D 2271/02* (2013.01); *B01D 2271/022* (2013.01); *B01D 2275/208* (2013.01); *B01D 2279/60* (2013.01)

USPC .................. 55/481; 55/480; 55/495; 55/503; 123/198 E

(58) Field of Classification Search
CPC .......... B01D 46/0002; B01D 46/0004; B01D 46/0005; B01D 46/0006; F02M 35/024; F02M 35/02416; F02M 35/02483
USPC ......... 55/478, 480, 481, 495, 503; 123/198 E
See application file for complete search history.

(56) References Cited

U.S. PATENT DOCUMENTS

| 8,246,702 B2 | 8/2012 | Ackermann et al. |
| 8,298,308 B2 * | 10/2012 | Li ................................. 55/385.3 |
| 2011/0099960 A1 | 5/2011 | Menssen et al. |
| 2012/0198802 A1 | 8/2012 | Menssen et al. |

FOREIGN PATENT DOCUMENTS

| DE | 3903378 A1 | 8/1990 |
| DE | 4115986 A1 | 11/1992 |
| DE | 202008010221 U1 | 12/2009 |

* cited by examiner

*Primary Examiner* — Robert Clemente
(74) *Attorney, Agent, or Firm* — James Hasselbeck

(57) ABSTRACT

A filter device comprises a filter element in a filter housing, wherein the filter housing is to be closed by a cover element. A friction section of the cover element, in an intermediate position between closed and open positions, is in friction contact with a friction member while in the closed position of the cover element the friction section is without friction contact with the friction member.

11 Claims, 5 Drawing Sheets

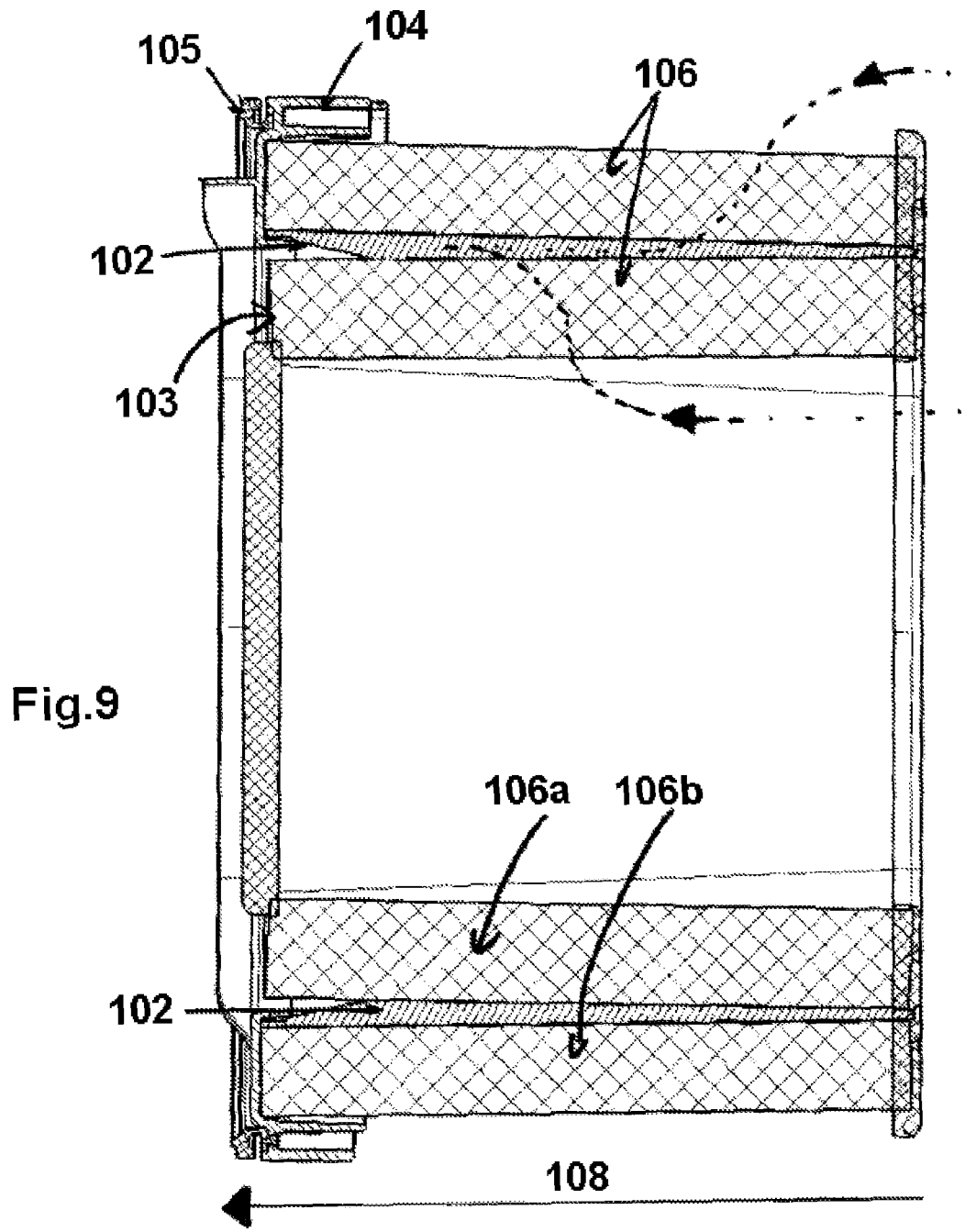

FILTERING DEVICE, IN PARTICULAR AIR FILTER

CROSS REFERENCE TO RELATED APPLICATIONS

This application is a Continuation in Part of U.S. application Ser. No. 13/445,325 filed Apr. 12, 2012 which is a US Bypass Continuation of International Application No. PCT/EP2010/064930 having a filing date of Oct. 6, 2010 and designating the United States, the International Application claiming a priority date of Oct. 12, 2009 based on prior filed German patent application No. 10 2009 049 170.8, the entire contents of the aforesaid U.S. application Ser. No. 13/445,325 being incorporated herein by reference. Further, this application is a Continuation in Part of U.S. application Ser. No. 12/589,527 filed Feb. 26, 2009 which claims priority to International Application No. PCT/EP2009/052315 filed Feb. 26, 2009 designating the United States. U.S. application Ser. No. 12/589,527 further claims a priority date of Feb. 26, 2008 based on prior filed German patent application No. 10 2008 011 186.4, the entire contents of the aforesaid U.S. application Ser. No. 12/589,527 being incorporated herein by reference. The present application claims priority to German patent application No. 102012006426.8 filed Mar. 30, 2012, the entire contents of German patent application No. 102012006426.8 being incorporated herein by reference

TECHNICAL FIELD

The invention concerns a filter device, in particular an air filter for an internal combustion engine.

PRIOR ART

EP 1 364 695 A1 discloses an air filter for an internal combustion engine that comprises in a filter housing a wound filter element which is flowed through axially by the air to be filtered. The filter element is inserted into a receiving chamber in the filter housing that is open in upward direction and can be closed by a cover element. This embodiment has the advantage that the cover element is positioned outside of the axial flow path through the filter element.

The cover element has two lateral projections which extend downwardly from a cover base member, covering the receiving opening in the inserted state, and which are resting between the exterior side of the filter element and the inner wall of the filter housing. For opening, the cover element must be lifted and friction between the projections and the filter element or the inner housing wall must be overcome.

SUMMARY OF THE INVENTION

The invention has the object to configure with simple constructive measures a filter device in such a way that a cover element on the filter housing is safely secured in the closed state and opening of the cover element can be performed safely and without the risk of injury.

The filter device is preferably an air filter, in particular for an internal combustion engine, wherein basically also other uses or applications are conceivable, for example, as a liquid filter. The filter device has a filter element that is flowed through by the fluid to be cleaned and is exchangeably received in a receiving chamber of a filter housing. The receiving chamber in the filter housing can be closed by a cover element that is embodied as a separate component embodied independent of the filter housing and is preferably frictionally secured on the filter housing in the closed position. For opening, the cover element must be removed against the frictional locking action from its position on the filter housing. Advantageously, the cover element is secured exclusively by frictional locking action on the filter housing.

In principle, as an alternative or in addition to the frictional locking action in the closed cover position, other securing means of the cover element on the filter housing are conceivable also, for example, closure elements or form fit.

Moreover, it is provided that a friction section of the cover element, in an intermediate position between closed and open cover position, is in friction contact with a friction member. At least in the intermediate position in which the cover element is still arranged on the filter housing but already lifted from the closed position, friction contact exists by means of the friction section of the cover element and the friction member that is arranged on the filter housing and/or on a component that is connected to the filter housing. In contrast to this, in the closed position of the cover element there is no or only a reduced friction contact between the friction section on the cover element and the friction member.

Various advantages are achieved with this embodiment. On the one hand, by means of the friction contact additional safety against accidental release of the cover element is provided. Moreover, during the detachment or opening action of the cover element, a friction contact is provided at least phasewise. As soon as the initial friction between cover and filter element has been overcome, the friction can drop for example to zero or a small value before the friction member reaches the friction section of the cover element. This reduces the danger that the user, when removing the cover element in case of tight space conditions, for example, under the hood or in a motor area of a motor vehicle, will hit his hands and be injured. Instead of a sudden drop of the friction forces during release of the cover a continuous reduction of the friction is now achieved. Accordingly, the release forces for removing the cover element are reduced.

Inasmuch as the cover element is also secured in the closed state by frictional locking action, the friction between the friction section on the cover element and the friction member compensates at least partially the friction force acting on the cover element in the closed state and being reduced during the opening process. Since on the other hand in the closed state no friction contact between the friction section of the cover element and the friction member exists, the friction is not further increased when the cover is closed so that release of the cover is possible without increased force expenditure. Only after the cover element has been lifted slightly, the friction contact between the friction section on the cover element and the friction member is created which, as described above, counteracts the sudden drop of the friction forces. The forces that are created upon contact between the friction section and the friction member are expediently however smaller than the friction force in the closed state of the cover element.

Even in case that the cover element in the closed state is locked by form fit or by securing elements on the filter housing, a safety gain is obtained with the embodiment according to the invention. After release of form fit or of the securing elements, the friction section comes into contact with the friction member as the cover element is removed so that a friction force is generated and the force for removing the cover element increases up to a maximum. This prevents a sudden removal of the cover element which could lead to injuries.

Basically, various embodiments are conceivable for the arrangement or positioning of the friction member on the filter devices. Possible is, for example, that the friction member is arranged on the exterior side of the filter element and/or on the inner wall of the filter housing. A portion of the cover element projects in the closed state into the filter housing and is located between the exterior side of the filter element and the inner side of the housing wall. Accordingly, the friction member can be arranged on one of the sides or on both sides.

The friction section of the cover element can optionally have an increased friction coefficient in order to increase the friction forces as soon as the friction section comes into contact with the friction element. However, possible in principle is also a smooth-walled embodiment of the friction section. Moreover, it is possible that the friction member is not arranged on the filter housing or on the filter element but on the cover element and the correlated friction section on the inner wall of the filter housing or the exterior side of the filter element. This is simply a reversal of the arrangement of friction section and friction member.

The friction section is located preferably on a cover projection which extends angularly relative to a cover base member of the cover element and preferably is formed monolithically with the cover base member that covers with closed cover element the opening in the filter housing by means of which the filter element is insertable into and removable from the receiving chamber in the filter housing. Advantageously, the cover element has two parallel arranged spaced-apart cover projections that engage the filter element and are positioned on oppositely positioned exterior sides of the filter element. Each cover projection is preferably provided with a friction section that has correlated therewith a friction member on the filter housing or the filter element, respectively. The cover projections can be elastically attached on the cover base member and in the closed cover position or in an intermediate position can be bent outwardly between the closed and open cover positions wherein, as a result of the elasticity, a clamping force is generated by means of the two cover projections that secures the intermediately positioned filter element; the friction or release force for removing the cover element is orthogonal to the clamping force. In particular in the embodiment with the friction member on the exterior side of the filter element, the desired friction force is generated in this way in the intermediate position.

According to a further embodiment, on the cover element a recess that is adjacent to the friction section is arranged which serves for receiving the friction member in the closed cover position. By means of the recess it is ensured that in the closed cover position the friction element and the friction section are positioned adjacent to each other and no or only a minimal friction force is produced between the part of the cover element that receives the friction section and the friction member. Only during removal of the cover element the friction section will come into contact with the friction member and generate a friction force in the desired way.

The transition between the recess and the friction section is advantageously ramp-shaped so that upon removal of the cover element a continuous increase of the friction force is ensured which is the result of the contact of the friction member on the cover element. When the friction section is reached, the friction force reaches its maximum. Along the further course, i.e., in the direction to the end face of the part of the cover element that receives the friction section, the friction section can optionally also descend, preferably in a ramp shape, so that after reaching the friction maximum a continuous decrease of the friction force is realized until complete release of the cover element is provided. Advantageous is also an embodiment with parallel orientation of the friction section.

The friction member on the exterior side of the filter element or the inner side of the filter housing can be designed differently. Conceivable is a friction member of rubber or TPE or different geometric configurations, for example, in the form of a straight friction bead which extends in particular transversely to the release direction of the cover element.

BRIEF DESCRIPTION OF THE DRAWINGS

Further advantages and expedient embodiments can be taken from the further claims, the figure description, and the drawings. It is shown in:

FIG. 9 a section of a filter element.

In the Figures the same components are provided with same reference characters.

EMBODIMENT(S) OF THE INVENTION

Figure 1:
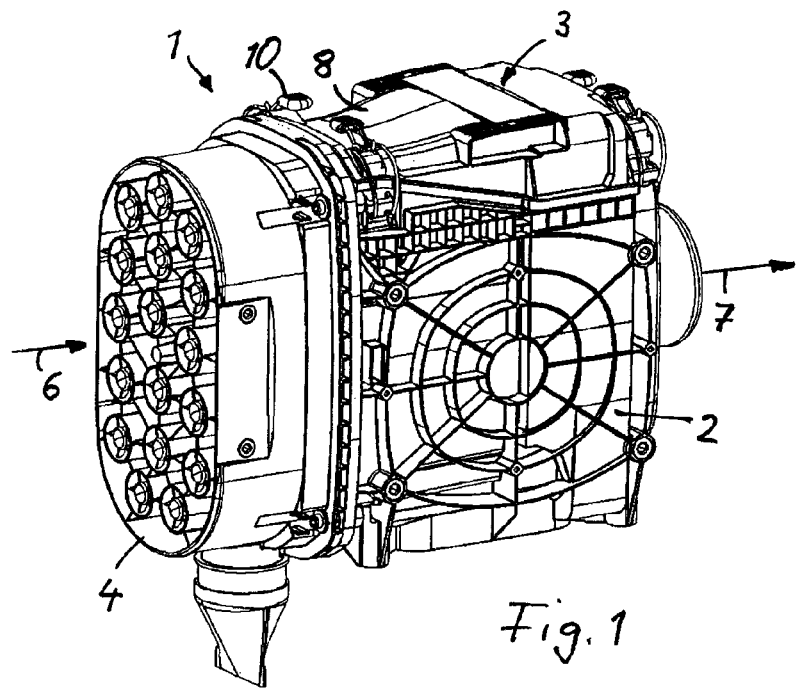
FIG. 1 a perspective view of an air filter with a filter housing onto which a cover element is placed.
Figure 2:
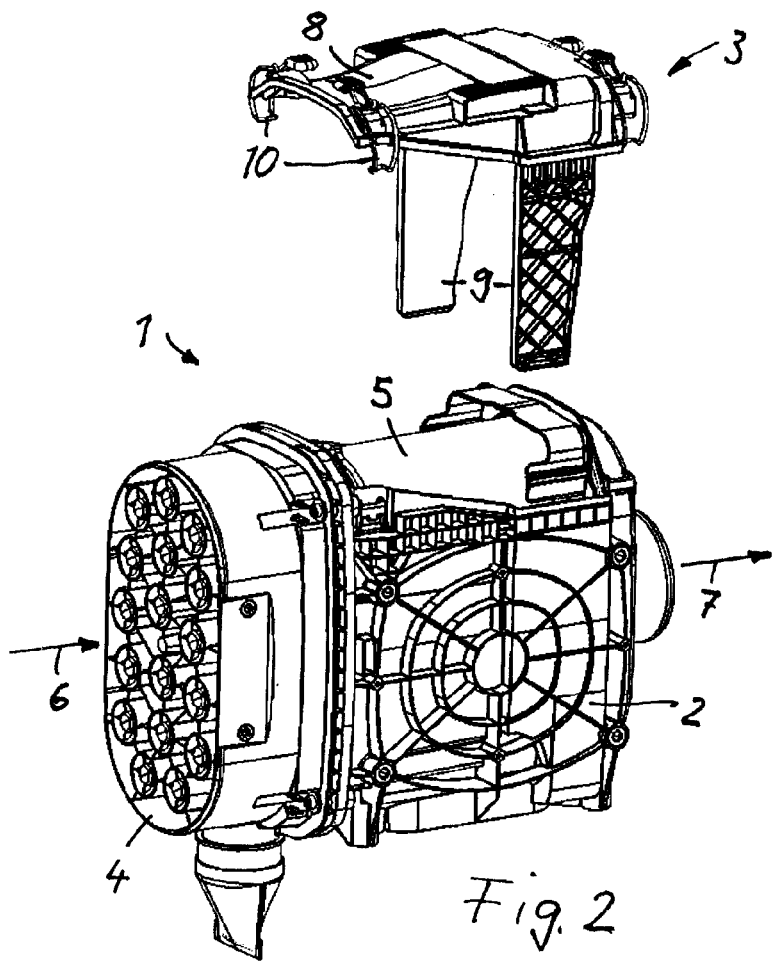
FIG. 2 an air filter with removed cover element.

As can be seen in FIGS. 1 and 2, the filter device 1 that is embodied as an air filter for an internal combustion engine comprises a filter housing 2 for receiving a filter element 5 (FIG. 2) that can be inserted exchangeably into a receiving chamber in the filter housing 2. The filter housing has an opening at the top by means of which the filter element 5 can be inserted or removed and which can be closed off by a cover element 3 which is shown in the closed state in FIG. 1 and in the open state in FIG. 2. The air filter is axially flowed through as indicated by arrows 6 and 7 wherein on the inflow side a cyclone preseparator 4 is arranged upstream of the filter element.

The cover element 3 has a cover base member 8 as well as two cover projections 9 that are formed monolithically with the cover base member and extend angularly thereto and are arranged parallel to each other and spaced apart from each other. The cover projections 9 have a bending elasticity and project when the cover element is closed into the intermediate space between the exterior side of the filter element 5 and the inner wall of the filter housing 2. When the cover 3 is closed, the cover projections 9 are secured with friction force on the filter element 5 or the inner wall of the filter housing 2. As additional securing means securing or closure elements 10 are provided which are arranged on the cover base member 8 and by means of which the cover element 3 is connected with the filter housing 2.

Figure 3:
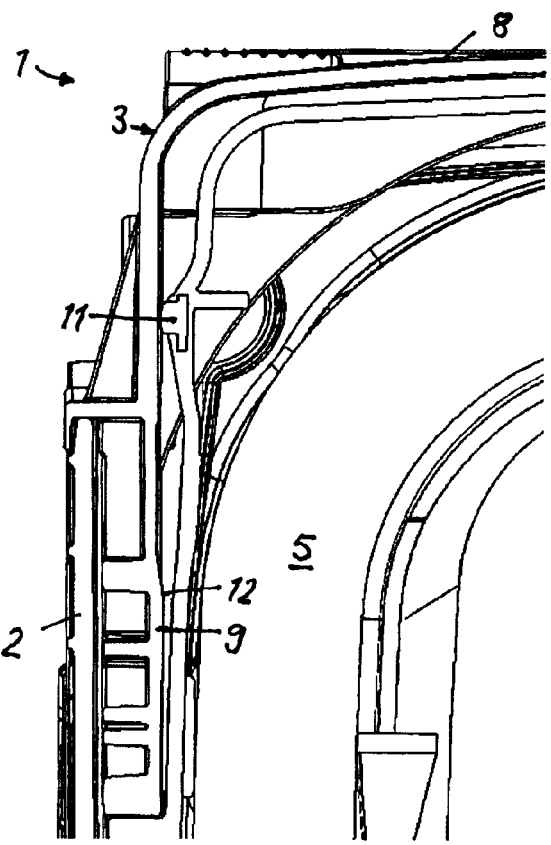
FIG. 3 a partial view with closed cover element wherein a friction member is positioned on the exterior side of the filter element in a recess of a cover projection of the cover element.
Figure 4:
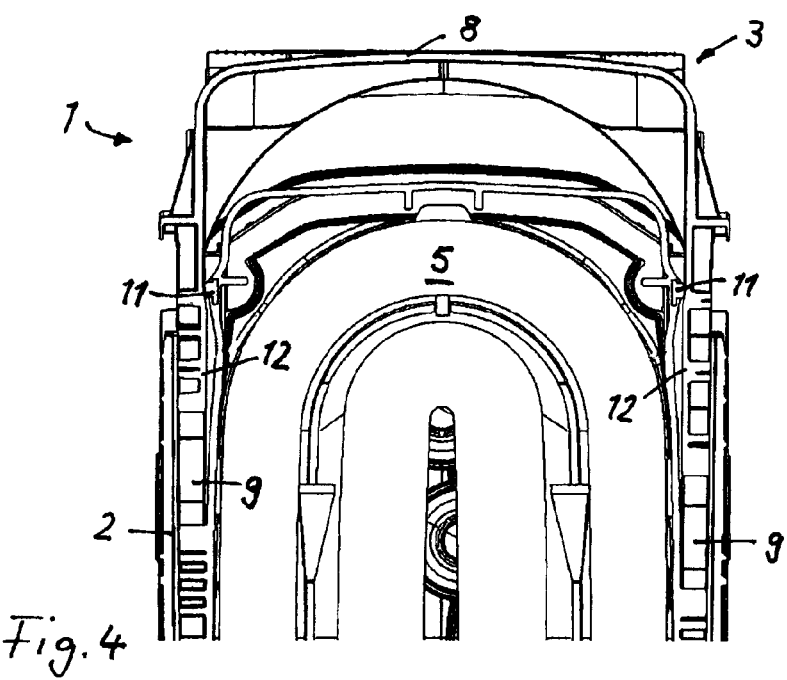
FIG. 4 the air filter with the cover element in a slightly lifted intermediate position in which the friction member is contacting a ramp-shaped section on the cover projection.

FIG. 3 shows the air filter 1 with closed cover element 3. FIG. 4 shows the air filter with the cover element in partially lifted intermediate position. On oppositely positioned exterior sides of the filter element 5, a friction member 11 is arranged, respectively, which in the intermediate position according to FIG. 4 is in contact with a ramp-shaped ascending slope on the inner side of each cover projection 9 wherein the ramp-shaped ascending slope extends up to a friction section 12 that, relative to the other sections on the cover projection 9, is projecting maximally inwardly. Along the further course, the friction section 12 drops straight in the direction of the free end face of the cover projections 9 so that the friction sections 12 on the two cover projections 9 extend parallel to each other.

When the cover element 3 is closed (FIG. 3), the friction member 11 is resting on an area of the cover projection 9 that projects less far inwardly. In this way it is ensured that, when the cover element is closed, no or only minimal friction force is acting between the friction member 11 and the cover projection 9 so that the cover element 3, after release of the closure element 10 and overcoming an initial friction, can be lifted from its seat in the filter housing. During lifting or opening movement of the cover element 3, the friction member 11 first comes into contact with the ramp-shaped ascending slope at the inner side of the cover projection and finally contacts the friction section 12 that represents the farthest inwardly projecting section. In this position, the friction force between cover projection 9 and friction member 11 is highest. This friction force compensates at least partially the reduction of the initial friction which must be overcome in order to lift the cover element from its seat in the filter housing.

The cover projections 9 are arranged elastically and springy on the cover base member 8 and upon insertion into the filter housing are bent outwardly so that, as a result of the elasticity, an inwardly acting force is exerted in radial direction with which the cover projections 9 are resting on the friction member 11. When the cover element is closed, the force is minimal or zero but it increases when reaching the ramp-shaped ascending slope and reaches a maximum in the area of the friction section 12.

Figure 5:
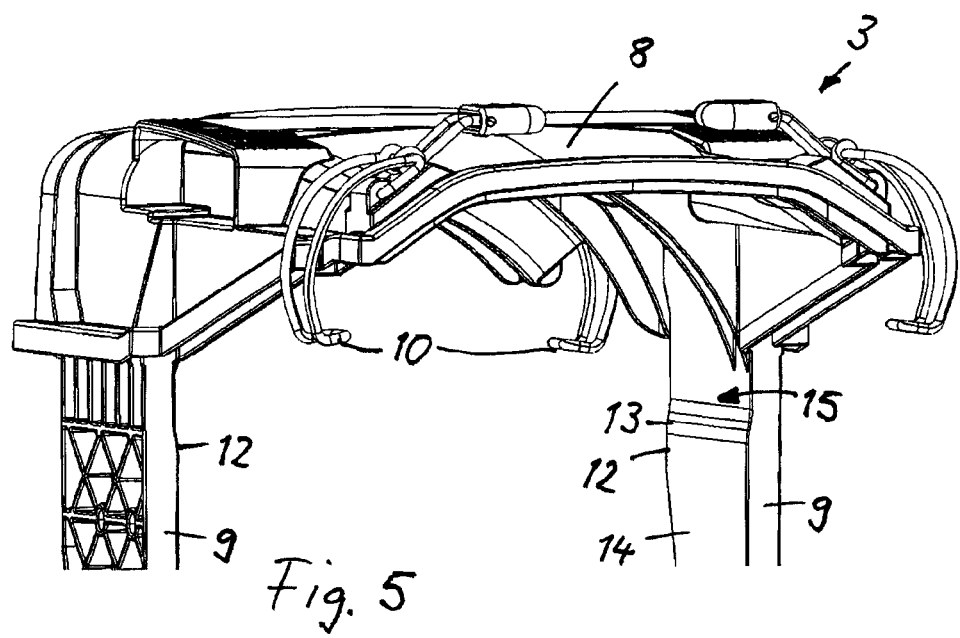
FIG. 5 the cover element in a perspective view.

FIG. 5 discloses the configuration of the inner surface of the cover projections 9 in detail. Viewed in the direction of the free end face of the cover projections 9, at the inner surface first the ramp-shaped ascending slope 13 begins which extends up to the friction section 12 that projects farthest inwardly. Along the further course the friction section 12 drops straight in the direction of the free end face of the cover projection 9 in the section 14 so that the friction sections 12 on the two cover projections 9 are parallel to each other. Immediately in front of the ramp-shaped ascending slope 13, on the side that is facing the cover base member 8, a recess 15 relative to the ramp-shaped ascending slope and the friction section 12 is provided on the inner side on which the friction member 11 is resting without friction when the cover element is closed (FIG. 3).

Figure 6:
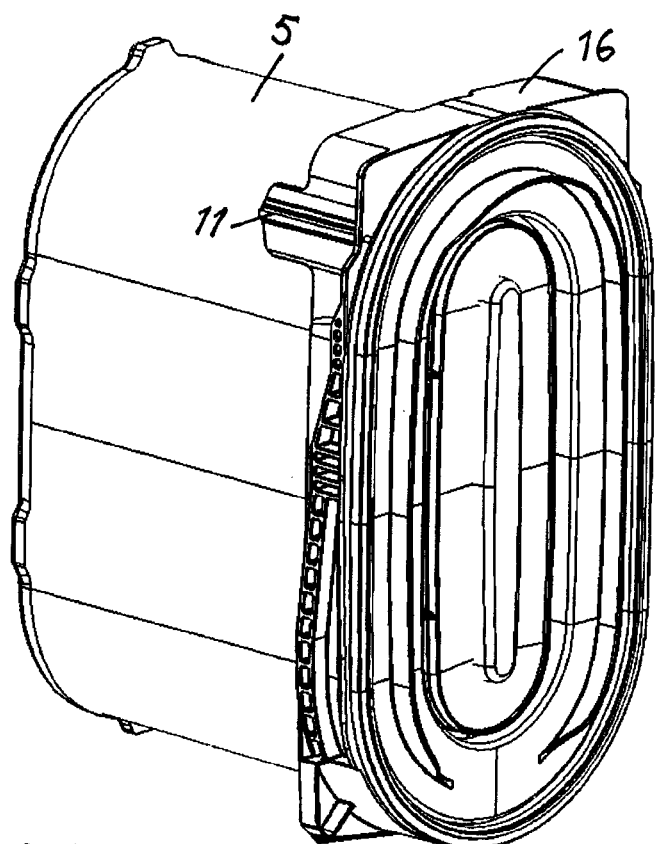
FIG. 6 a filter element in perspective illustration.
Figure 7:
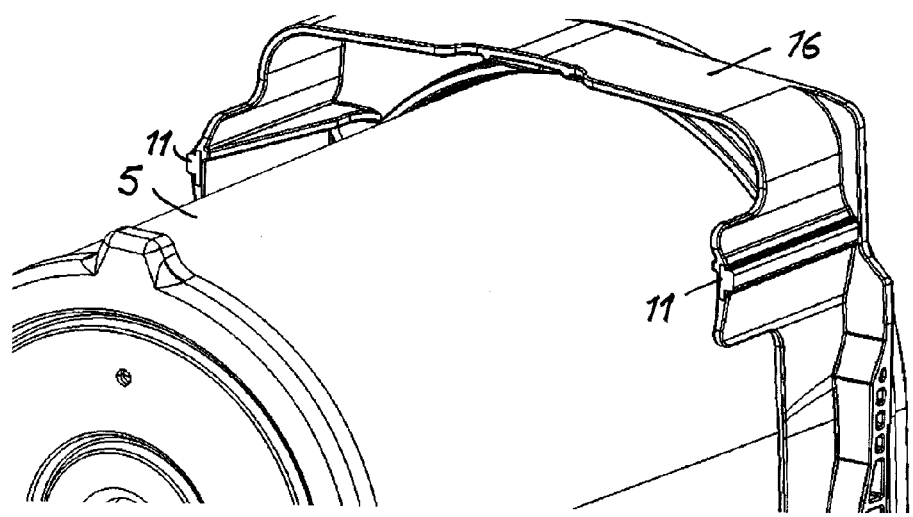
FIG. 7 a detail of the filter element with the friction element.
Figure 8:
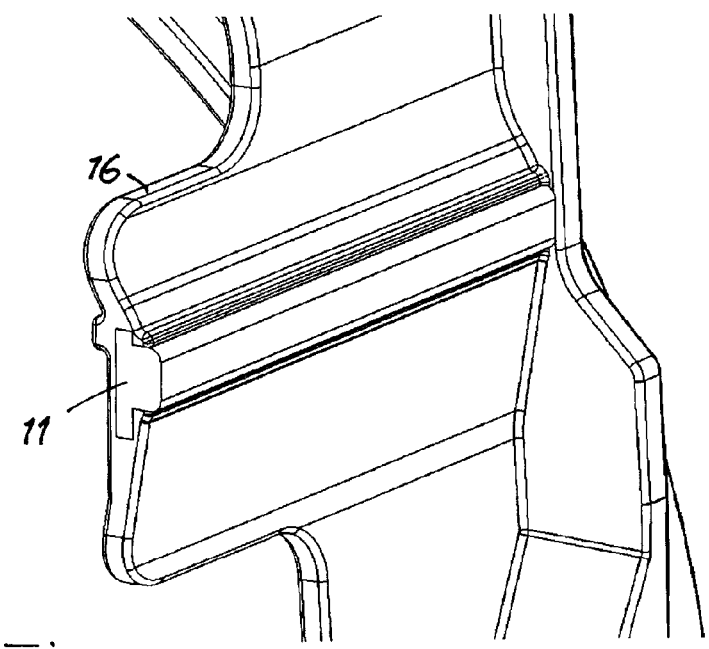
FIG. 8 the friction element in a detail illustration.

In the FIGS. 6 to 8 the friction member is illustrated in detail; it is arranged on a frame 16 which is adjacent to an end face of the filter element 5 and surrounds the filter element 5. The friction element 11 which, for example, is made of rubber or TPE is of a straight configuration and forms a friction bead which extends in axial direction, i.e., in the flow-through direction, of the filter element 5. Relative to the removal direction of the cover element, the friction member 11 extends in transverse direction so that the friction member 11 across its length is in contact with the ramp 13 as well as the friction section 12 or 14.

FIG. 9 shows an embodiment of a filter insert according to the invention. In this embodiment, on the end surface 103 of the filter element 106 at the outlet side a frame 104 is arranged that supports an axially acting seal 105. The filter element 106 is comprised of two star-shape folded annular filter media bellows 106a and 106b. The filter media bellows each have an oval cross-section with two straight parallel sections positioned opposite one another. A smaller filter media bellows 106a is concentrically arranged within the annular space that is enclosed by the larger filter media bellows 106b such that between the filter media bellows a flow passage 102 is provided for the medium to be filtered that is passing through.

In the area of the end surface 103 at the outlet side of the filter element 106 the flow passage 102 provides the outflow opening of the filter element 106, while at the end surface at the inlet side the filter media bellows 106a, 106b are seal tightly connected with one another. The interior of the smaller filter media bellows 106a is closed off seal-tightly in the area of the end surface 103 at the outlet side by an end disk or a similar structural element.

In this way, the larger filter media bellows 106b is flowed through from the exterior to the interior and the inner filter media bellows 106a from the interior to the exterior.

In this way, by means of the filter insert a deflection of the flow is achieved wherein the flow deviates from the main flow direction 108 that is defined by the connection of the end surface at the inlet side to the end surface 103 at the outlet side.

The frame 104 surrounds in the area of the end surface 103 at the outlet side the lateral sides of the filter element 106.

The invention claimed is:

1. An air filter device, comprising:
a filter housing;
a filter element arranged in the filter housing and flowed through by the fluid to be filtered;
a cover element that is secured frictionally in a position placed onto the filter housing;
wherein a friction section of the cover element, in an intermediate position between closed and open position of the cover element, is in friction contact with a friction member and, in the closed position of the cover element, is without friction contact or is in reduced friction contact with the friction member;
wherein the friction member is arranged at an inner side of the filter housing.

2. The air filter device according to claim 1, wherein the friction member is arranged on an exterior side of the filter element.

3. The air filter device according to claim 2, wherein
the friction section of the cover element is formed on a cover projection insertable into the filter housing and extending angularly relative to a cover base member;
wherein two cover projections extending angularly to the cover base member are provided;
wherein the two cover projections are bent outwardly in the intermediate position of the cover;
wherein on the cover element a recess is arranged adjacent to the friction section in which the friction member is positioned in the closed cover position.

4. The air filter device according to claim 1, wherein
the friction section of the cover element is formed on a cover projection insertable into the filter housing and extending angularly relative to a cover base member.

5. The air filter device according to claim 4, wherein
two cover projections extending angularly to the cover base member are provided.

6. The air filter device according to claim 5, wherein
the two cover projections are bent outwardly in the intermediate position of the cover.

7. The air filter device according to claim 1, wherein
the friction member is embodied as a straight friction bead.

8. The air filter device according to claim 1, wherein
the friction during opening of the cover drops with delay.

9. An air filter device, comprising:
a filter housing;
a filter element arranged in the filter housing and flowed through by the fluid to be filtered;

a cover element that is secured frictionally in a position placed onto the filter housing;

wherein a friction section of the cover element, in an intermediate position between closed and open position of the cover element, is in friction contact with a friction member and, in the closed position of the cover element, is without friction contact or is in reduced friction contact with the friction member;

wherein on the cover element a recess is arranged adjacent to the friction section in which the friction member is positioned in the closed cover position;

wherein the transition between the recess and the friction section is ramp-shaped.

10. The air filter device according to claim 9, wherein the friction section of the cover element is formed on a cover projection insertable into the filter housing and extending angularly relative to a cover base member;

wherein two cover projections extending angularly to the cover base member are provided;

wherein the two cover projections are bent outwardly in the intermediate position of the cover.

11. An air filter device, comprising:

a filter housing;

a filter element arranged in the filter housing and flowed through by the fluid to be filtered;

a cover element that is secured frictionally in a position placed onto the filter housing;

wherein a friction section of the cover element, in an intermediate position between closed and open position of the cover element, is in friction contact with a friction member and, in the closed position of the cover element, is without friction contact or is in reduced friction contact with the friction member;

wherein the friction section extends straight to the end face of the part of the cover element that receives the friction section.

* * * * *